Sept. 13, 1955  W. C. CHAPMAN  2,717,537
METHOD AND APPARATUS FOR MANUFACTURING
FIBER-CEMENT SHINGLES
Filed Dec. 18, 1950  2 Sheets-Sheet 1

INVENTOR.
WILLIAM C. CHAPMAN
BY *Arlington C. White*
ATTORNEY

Sept. 13, 1955
W. C. CHAPMAN
2,717,537
METHOD AND APPARATUS FOR MANUFACTURING
FIBER-CEMENT SHINGLES
Filed Dec. 18, 1950
2 Sheets-Sheet 2
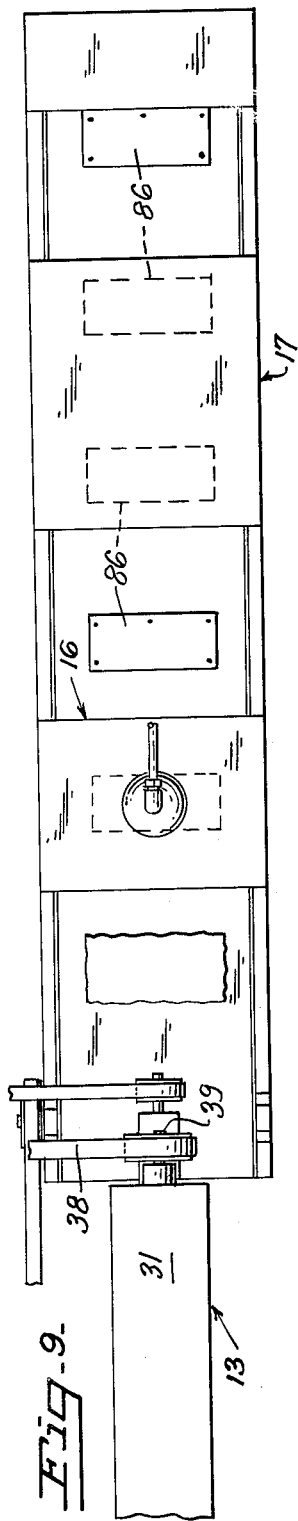
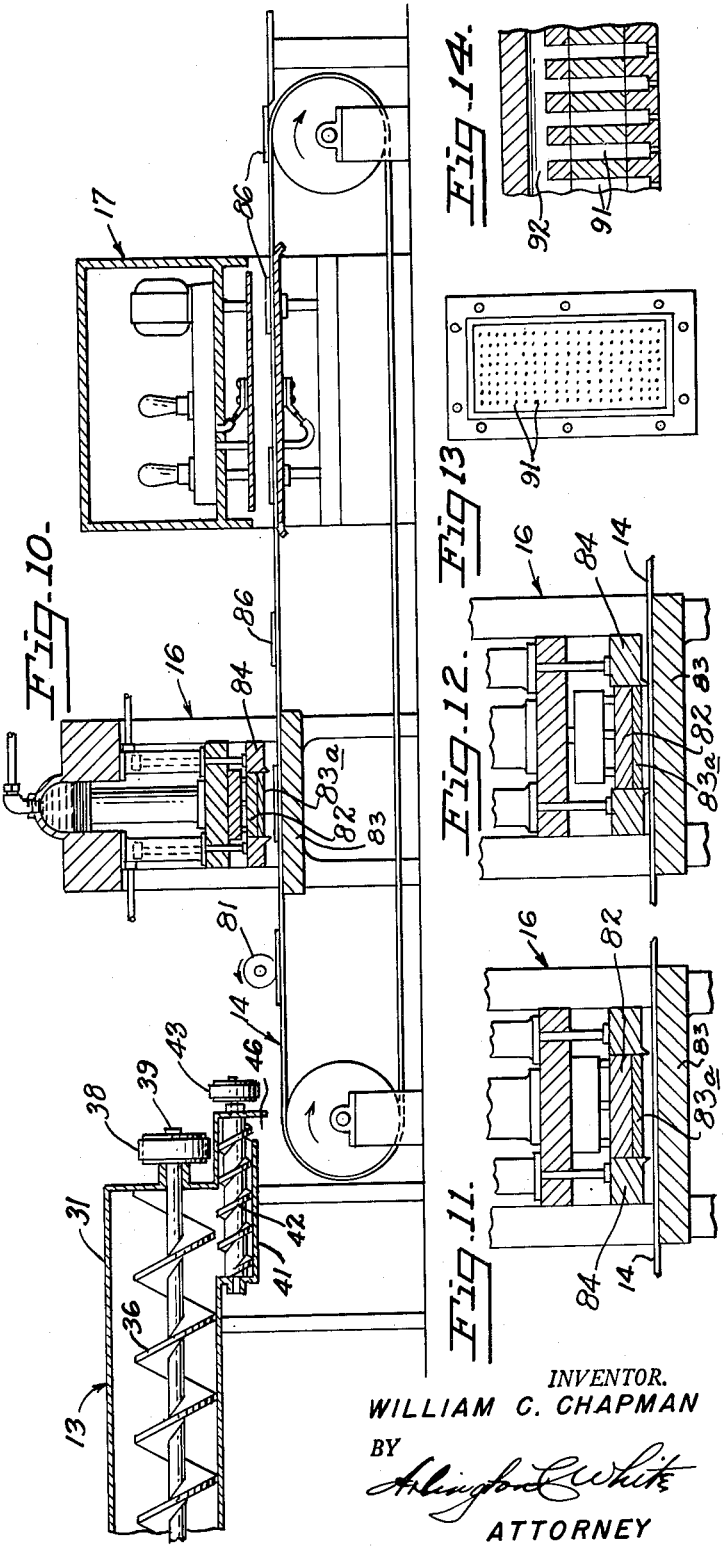
INVENTOR.
WILLIAM C. CHAPMAN
BY
ATTORNEY

2,717,537

United States Patent Office

Patented Sept. 13, 1955

2,717,537

METHOD AND APPARATUS FOR MANUFACTURING FIBER-CEMENT SHINGLES

William C. Chapman, Redwood City, Calif., assignor, by mesne assignments, of sixty per cent to Fiberstone, Inc., San Francisco, Calif., a corporation of California Application December 18, 1950, Serial No. 201,388

12 Claims. (Cl. 92—39)

The invention, in general, relates to shingle production and more particularly relates to an improved method as well as improved apparatus for manufacturing a fiber-reinforced, hard, dense and homogeneous shingle of monolithic concrete section which is exceptionally strong and relatively moisture-proof.

While there have been developed heretofore numerous and various methods and apparatuses for producing fibro-cementitious sheets, the majority of such prior methods and equipment depend upon the utilization of non-free-flowing mixtures of asbestos and cement with the result that these prior machines, in the main, are somewhat cumbersome and complex and, in addition, these prior methods are discontinuous and require not only frequent and recurrent attention at various stages of the process to insure effective results but also require additional processing, such as trimming, subsequent to the forming action of the equipment. The present invention is directed to obviating inherent disadvantages of prior equipment and processes, involving undue material waste and operational delays, and affords the utilization of free-flowing mixtures of fiber, hydraulic cement and water.

A primary object of my invention is to provide an improved, substantially continuous method of manufacturing fibro-cementitious shingles utilizing free-flowing asbestos-cement mixtures.

Another important object of the present invention is to provide an improved method of the indicated nature which is additionally characterized by the injection of separated and individual fibers into hydraulic cement affording a more homogeneous mixture and resulting in increased strength and enhanced flexibility of the end product.

A still further object of the invention is to provide an improved method of the aforementioned character which includes a closed fiber separation system insuring complete coverage of individual fibers with hydraulic cement in the mixture-forming stage and also which avoids fiber waste.

Another object of the present invention is to provide improved equipment and methods of manufacturing fibro-cement shingles of increased strength and flexibility, utilizing free-flowing asbestos-cement mixtures, which affords substantially continuous, automatic production of the shingles expeditiously and more economically.

Other objects of the invention, together with some of the advantageous features thereof, will appear from the following description of a preferred embodiment of my improved equipment as illustrated in the accompanying drawings as well as from the following description of a preferred mode of practicing the invention. It is to be understood, however, that I am not to be limited to the precise embodiment of apparatus illustrated, nor to the precise arrangement of the various parts thereof, nor to the precise order of steps of the process set forth, as my invention, as defined in the appended claims, can be embodied in a plurality and variety of forms and can be practiced in a variety and plurality of ways.

Referring to the drawings:

Fig. 9 is a fragmentary top plan view of the conveyor of the preferred embodiment of the invention, this view showing in dotted and full lines the pallets on which the extruded fibro-cementitious mixtures are deposited in spaced relationship and conveyed during various stages of the process.

Fig. 10 is a fragmentary, sectional front elevational view of the extruder, conveyer, press and drying units of the preferred embodiment of my invention.

Fig. 11 is an enlarged, fragmentary sectional elevational view of the press of the preferred embodiment of the invention, this view showing the positions of the press parts at one extreme position thereof.

Fig. 12 is an enlarged, fragmentary sectional elevational view similar to Fig. 11 but with the press parts in their other extreme positions.

Fig. 13 is a plan view of the conforming ring of the improved press employed in the preferred embodiment of my invention.

Fig. 14 is a cross-sectional view of an improved dye-punch of my improved press illustrating the water channels for extracting excess water during the stage of pressing of the mixture and the forming of the shingles.

Figure 1:
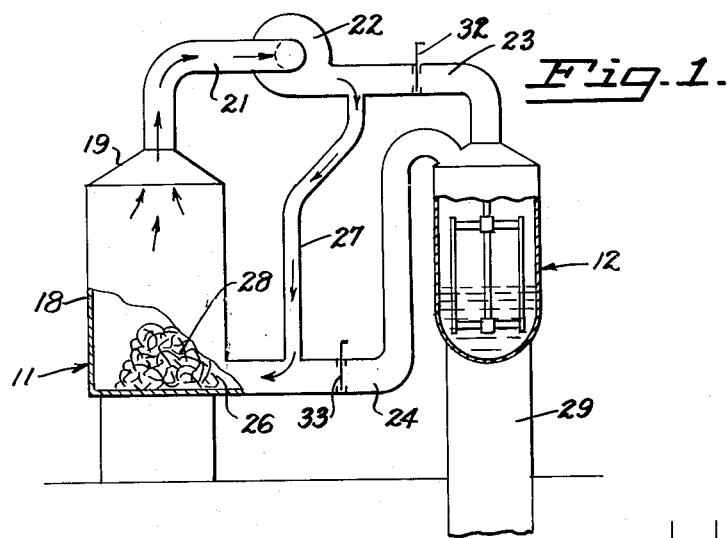
Fig. 1 is a fragmentary front elevational view of the fiber separating and fibro-cementitious mixing chambers of the preferred embodiment of my present invention.

As illustrated in the accompanying drawings, the improved apparatus of the present invention for manufacturing improved shingles of monolithic concrete section preferably comprises five major units including a closed system, generally designated by the reference numeral 11, for separating individual fibers from a mass of asbestos and introducing the individual fibers to a mixing chamber for preparing a free-flowing mixture of asbestos fiber, hydraulic cement and water; the mixing chamber being generally designated by the reference numeral 12. The five major units also include an extruder unit for extruding the free-flowing mixture in predetermined volumes, generally designated by the reference numeral 13, a conveyer for intermittently receiving in spaced areas thereof from the extruder unit predetermined volumes of the free-flowing mixtures, the conveyer being generally designated by the reference numeral 14, a press in which the predetermined volumes of the free-flowing mixtures are received and pressed into shingles of predetermined dimensions and formed with desired surfaces, the press being designated generally by the reference numeral 16, and a special dryer for rapidly setting or final curing of the pressed and formed shingles, the dryer being generally designated by the reference numeral 17.

In accordance with the present invention, and as particularly illustrated in Fig. 1 of the drawings, I provide as parts of the closed system 11 containing the mixing chamber 12, a fiber chamber 18 having a removable top 19 thereon for permitting the loading of the chamber with a predetermined amount of asbestos fibers. The chamber 18 is placed in communication by means of a conduit 21 with a blower 22, the outlet of which leads to a conduit 23 that establishes comunication between the blower 22 and the mixing chamber 12. An air return conduit 24 leads from the top of the mixing chamber 12 to a bottom inlet 26 of the fiber chamber 18 and I also provide a by-pass conduit 27 in the system which establishes communication between the blower outlet conduit 23 and the air return conduit 24 of the closed system 11.

As an initial step of my improved process, a predetermined quantity of hydraulic cement and water is disposed in mixing chamber 12 and the mixer or agitator, not shown, is started so as continuously to keep the contents of chamber 12 under agitation. A predetermined quantity of asbestos 28 is placed in the fiber chamber 18 and the blower 22 placed in operation which sets up a circulating air current within chamber 18 to disperse the asbestos fiber mass and separate the asbestos into individual fibers as well as draw the individual fibers up through the conduit 21 into the blower. While not shown in the schematic view of Fig. 1, the blower 22 includes high-speed impellers which strike the individual fibers and separate any fibers which are adhering to each other and thereby complete the separation of the fibers into individual fibers. The circulating air currents set up by the blower 22 carries the individual fibers from blower 22 through conduit 23 into the top of the mixing chamber 12 which contains the agitating mixture of hydraulic cement and water. Since the air current is travelling at a high velocity down through the top of the mixing chamber, the individual fibers are driven directly into the agitating mix and each individual fiber is immediately surrounded and embedded into the hydraulic cement and water mix. At this stage of the process, the air current set up by the blower and passing through the mixing chamber 12 reverses itself and continues at high velocity out of the top of the mixing chamber through conduit 24 and back to the bottom of the fiber chamber 18 through the inlet 26 thereof. After all of the asbestos fiber has been acted upon by the circulating air current at high speed to drive the individual fibers into the agitating mix in mixing chamber 12, the blower 22 is stopped and the mix in mixing chamber 12 is left to agitate until needed and thereafter the mix is transferred to the extruder unit 13 through the chute 29 which is in communication with the bottom outlet of the mixing chamber 12 as well as in communication with an extruder reservoir 31. As illustrated in Fig. 1, I provide a gate valve 32 in conduit 23 as well as a gate valve 33 in air return conduit 24 of the closed system 11 so that air circulation is had only between the blower 22 and the fiber chamber 18 under certain conditions merely by closing these gate valves 32 and 33.

In actual operation of my improved equipment and the practice of my improved process, I have found that the preliminary separation of the asbestos fibers into individual fibers and the driving of each individual fiber into the mix of the mixing chamber 12 is highly advantageous inasmuch as each individual fiber will be tenaciously held in the mixture rather than being allowed to enter the mix in adhering groups or batches and a more homogeneous mix results which will provide greater strength and flexibility in the final or end product. In this manner, fiber waste is avoided and since the fiber separation and mixing unit are in a closed system there is no likelihood of dust entering the system nor any fibers to escape. Moreover, the use of the by-pass 27 by closing of the gate valves 32 and 33 provides for increased air circulation and increased separation of the individual asbestos fibers from the asbestos mass and thus insures that complete separation is had and no adhering fibers are delivered into the mixing chamber 12. The utilization of the by-pass 27 in the closed system 11 is especially advantageous when the asbestos mass or batch in fiber chamber 18 contains especially adhering fibrous materials.

Figure 2:
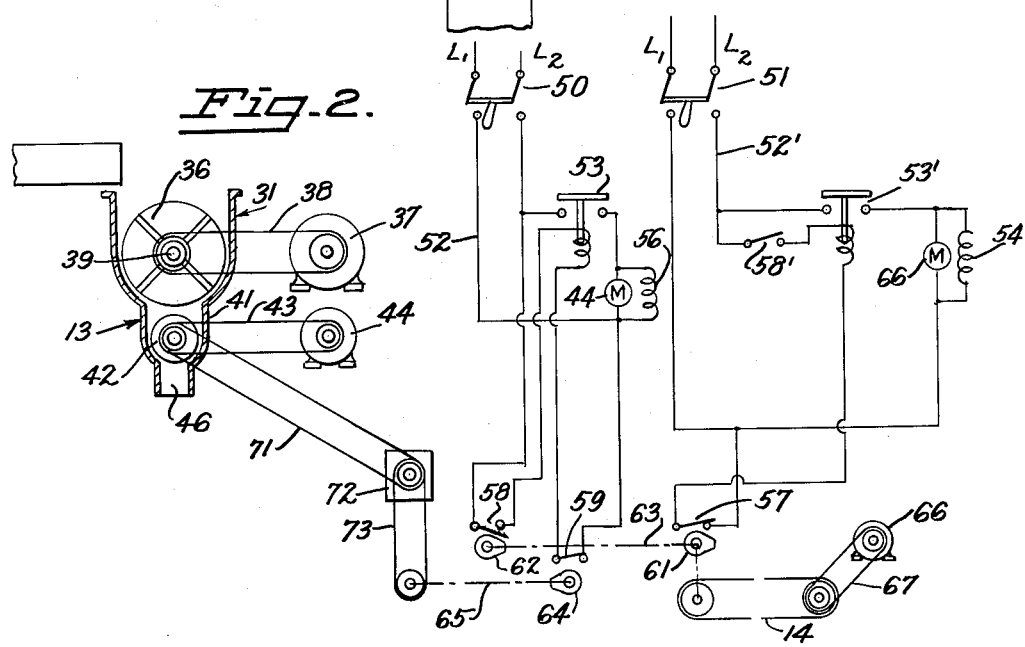
Fig. 2 is a partial elevational and diagrammatic showing of the extruder employed in the preferred embodiment of the invention, together with electrical control circuit for effecting timed operation of the extruder with other units of the apparatus.
Figure 3:
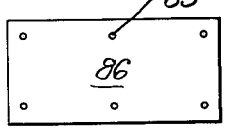
Fig. 3 is a plan view of a plain shingle produced with my improved equipment and method.

With particular reference to Figs. 2 and 10 of the annexed drawings, it will be observed that the extruder reservoir 31 is supported in a horizontal position and that I mount in the reservoir 31 an agitator 36 which preferably is of the screw-type, see Fig. 10. Any suitable motor 37, although preferably of the gear type which operates continuously, is employed for driving the agitator 36 and to this end I preferably provide a belt drive 38 between the motor 37 and the shaft 39 of the agitator 36. The reservoir 31 has an extended chamber 41 thereon and the agitated free-flowing mixture passes from the reservoir 31 directly into the extruder unit 13 which contains a screw-type extruder 42 driven, preferably by belt 43 from a gear type motor 44, see Fig. 2. The extruder unit 13 terminates at its outlet end in a mouth 46 which may be made to any desired shape in order that the extruded batches of the free-flowing, fibro-cementitious mix can be varied in thickness, width and shape at the will of the operator. As shown in Fig. 10 of the drawings, the mouth of the extruder unit 13 overlies one end of the upper run of the conveyer unit 14 so that the extruded, free-flowing mixture in predetermined quantities and of predetermined thickness and width and shape will be deposited directly onto the upper run of the conveyer unit 14 from the extruder unit 13.

In accordance with my invention, the extruder is operated intermittently and in synchronism with intermittent operation of the conveyer so that extruded batches of the free-flowing, fibro-cementitious mixture are deposited upon the upper run of the conveyer 14 in successive, spaced areas. The mouth 46 of the extruder unit 13 constitutes a nozzle and, of course, if the width, thickness or shape of the extruded batches are to be varied it is only necessary to replace the nozzle for effecting the desired dimensions and shapes of the extruded batches. In Fig. 2 of the annexed drawings, I have shown diagrammatically one type of electromechanical system for controlling the timed relationship between movements of the conveyer 14 and the screw-type extruded conveyer 42. As shown, this control system includes two inter-related electrical circuits consisting of two pairs of electrical conductors $L_1$ and $L_2$ leading from a source of electrical energy, not shown, together with main switches 50 and 51 for opening and closing the circuits 52 and 52' at will. The circuit 52 includes a relay or magnetic locking switch 53 for holding the circuit closed, together with a motor brake element 56 for limiting the movement of the extruder conveyer 42 which is driven from motor 44 contained in the circuit 52. In addition, this circuit includes a pair of limit switches 58 and 59 which are engaged periodically and recurrently as hereinafter described for effecting intermittent operation of the extruder conveyer 42. The circuit 52' includes a relay or magnetic locking switch 53' for holding this circuit closed, together with a motor brake element 54 for limiting the movement of the main conveyer 14 which is driven by the motor 66 contained in circuit 52'. This latter circuit also includes a pair of limit switches 57 and 58' of which the switch 57 is engaged periodically and recurrently for effecting intermittent operation of the conveyer. The electro-mechanical system also includes a pair of cams 61 and 62 on a cam shaft 63 driven by conveyer 14 as well as a cam 64 on a cam shaft 65 driven from the extruder conveyer 42. A variable speed drive mechanism, including the chains 71 driven from the extruder conveyer 42 as well as a manually shiftable variable three-speed gear unit, shown in block diagram by the reference numeral 72, together with chains 73 connected to the extruder cam shaft 65 serves to effect variance to rotation of such cam shaft as well as to effect variance in the rotation of the extruder conveyer 42 thereby to control the amounts of extruded mixtures from the extruder unit 13.

In operation, the timing control for regulating the movement of the endless conveyer 14 in timed relation with the movement of the extruder conveyer 42, is placed into action by closing the main switches 50 and 51 of the two circuits 52 and 52', thereafter momentarily closing the normally open limit switch 58', and immediately releasing the lever or button of such switch whereupon the relay or magnetic locking switch 53' is closed and the circuit 52' is held closed during the operation of the equipment electrically connected into such circuit. The closing of locking switch 53' and circuit 52' starts the motor 66 which drives main conveyer 14, and after the upper run of conveyer 14 travels a predetermined linear distance a cam 61 on cam shaft 63, the latter being mechanically coupled to and actuated by conveyer 14, opens a normally closed limit switch 57 whereupon the conveyer 14 stops because of the breaking of circuit 52' as well as the action of break element 54 operating on motor 66. In the meantime, a second cam 62 on cam shaft 63 effects the momentary closing of normally open limit switch 58 which energizes the relay or magnetic locking switch 53 to hold circuit 52 closed during the operation of the equipment electrically connected into such circuit, thus starting the extruder conveyer 42 which is driven by motor 44 in circuit 52. After the extruder conveyer 42 has made a predetermined number of turns to effect the extrusion of a predetermined amount of the fibro-cementitious mixture, a cam 64 on extruder came shaft 65, which is mechanically coupled to the extruder conveyer 42, effects the momentary opening of limit switch 59 to break the circuit 52 thus stopping the extruder conveyer 42 rapidly because of the action of the break unit 56 operating on extruder motor 44. These cycles of operation are repeated again and again recurrently to move the main conveyer 14 so that its upper run advances a predetermined distance linearly and intermittently while the extruder conveyer 42 recurrently moves through a predetermined rotative distance, in synchronism with the movement of conveyer, so as intermittently to deposit from the nozzle or mouth 46 of the extruder 31 predetermined amounts or batches of the mixture upon successive, spaced areas of the upper run of conveyer 14.

In accordance with the present invention, the conveyer belt of the main conveyer 14 can be either a rubber belt, a steel belt, a perforated steel belt, or a paper covered steel belt and, if desired, predetermined dimensioned pallets can be carried on the conveyer 14 in predetermined spaced relationships to receive the deposits of the mixture from the extruder unit 13. In the present embodiment of the invention in the improved equipment, I provide a roller 81 between the extruder unit 13 and the press 16 in order that the mixture carried on the chain or belt conveyer can be spread to close to its final width and length with respect to the die of the press. The roller 81 conveniently can be driven by the conveyer and as it is arranged to turn at a speed so that its surface travels at the same speed as the surface speed of the conveyer and, at its point of contact with the free-flowing mixture on the surface of the conveyer, the roller 81 travels in the same direction as the conveyer. Roller 81 may be provided with a steel surface or a rubber covered steel surface, as desired. Moreover, I have found it desirable to apply a free flow of water over the exterior surface of roller 81 to prevent the adhering of the mixture to such surface and I have provided that the position of the roller 81 with respect to the conveyer 14 may be adjusted to compensate for the varying thicknesses of the free-flowing mixture and depending upon the thickness of the end product desired. Roller 81 also is provided with fixed sides in order that the width of the free-flowing mixture on the pallet of the conveyer can be determined.

In Figs. 10, 11 and 12 of the annexed drawings, I have illustrated the preferred type of press utilized in my improved process which preferably comprises a fast acting, double acting ram precision oil-hydraulic press capable of exerting 200 tons pressure and capable of moving at the rate of twenty cycles per minute insofar as movement of the forming die is concerned to form and press out the shingles. The press travel is approximately two inches and by virtue of the high-volume, low-pressure pump action the moving platens are raised and lowered at high speeds. At a point close to the bottom of its travel, a valve, not shown, cuts off the low-pressure circuit and cuts in the high-pressure circuit in order that approximately 1000 pounds per square inch pressure is applied upon the mixture. The press is so constructed and so operated that the dwell at the bottom of its travel is only approximately one-half second and the total elapsed time of down travel, dwell and up travel is approximately one second. Moreover, with this type of press and the timed relationship of its operation to the movement of the main conveyer 14, the time of feeding the mixture to the press and removing a finished shingle therefrom is approximately one second and the complete operation of moving the mixture into the press 16 and carrying out the press and forming action therein is carried on at the rate of approximately thirty cycles per minute and since one shingle, approximately 12 inches by 24 inches, is formed on each cycle the production rate is approximately thirty singles per minute. With particular reference to Figs. 10, 11 and 12 of the annexed drawings, it will be observed that the press 16 includes a top die 82 and a bottom die 83, the top die being a moving or movable die and the bottom die 83 being a stationary die. The movable die is carried from its raised position, see Fig. 10, by the action of the press for a distance of approximately two inches. The press also includes a conforming-ring 84 about the die 82 and the conforming-ring lowers one inch at the same time the press lowers; the press continuing to travel after the conforming-ring 84 has contacted the bottom die or plate 83. In this action the hydraulic cylinders of the press release hydraulic fluid during the lowering of the die 82 and it is to be understood that the lowering of the press and consequently the lowering of the upper die 82 continues until the die or punch 82 contacts the free-flowing mixture and spreads such mixture to the dimensions of the conforming-ring 84 since the mixture in this improved process is free-flowing. The action of the press downward continues to remove excess water from the mixture and to form nail holes 85, see Fig. 4 of the drawings, when desired as well as to emboss the upper surface of the shingle 86, if desired and in such case a suitable embossing surface or plate 83a containing a nail-forming element is affixed to the lower surface of the punch of upper die 82; the complete downward movement effecting the pressing of the mixture into a dense, homogeneous and exceptionally strong end product. The punch or die 82 remains in its lowered position momentarily while the action of the press first raises the conforming-ring 84 to strip the shingle, such action being effected by electrically operated solenoid-valves, not shown, associated with the hydraulic cylinders of the press. Thereafter, the press raises and raises with it the conforming-ring 84 as well as the upper or movable die or punch 82 leaving the finished shingle setting on the pallet or the conveyer belt to be removed by the operation of main conveyer 14. On this final action of the press the press and top or movable die return to their initial positions and the shingle is removed as a new mixture is fed to the press upon the renewed movement of the main conveyer 14.

One of the principal improvements of the present invention comprises the extraction of excess water from the free-flowing mixture while the single is being formed and pressed in the hydraulically operated press 16. To this end, the die punch 82 preferably is formed with a continuous groove 91 extending from one lateral extremity thereof to adjacent to the opposite lateral extremity thereof; the groove 91 communicating with a longitudinally extending groove 92 through which air is passed to carry off the expelled or extracted water from the mixture. Any suitable blower can be set up adjacent to the press 16 for driving air under pressure through groove 92 and taking off all excess water removed from the free-flowing fibro-cementitious mixture during the pressing operation of the hydraulic press 16.

Figure 4:
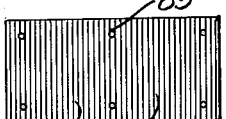
Fig. 4 is a plan view of another type shingle produced by my improved method and apparatus, this shingle having striations extending completely across the same.
Figure 5:
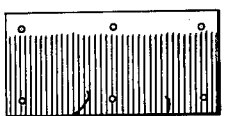
Fig. 5 is a plan view of still another type of shingle produced by my preferred method and apparatus, this shingle having striations terminating short of one lateral edge thereof.
Figure 6:
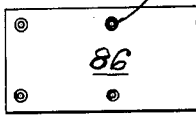
Fig. 6 is a plan view of another type shingle produced by my preferred method and apparatus with counter-sunk nail holes formed therein.
Figure 7:
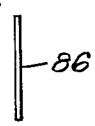
Fig. 7 is an end view of shingles produced by my improved method and apparatus.

In Figs. 3 to 8 inclusive, of the drawings, I have illustrated the variable types of shingles which may be all produced by my improved equipment at the rate of thirty shingles per minute and the surface and shape of the end product control the type of die punch utilized in the press. Should it be desired to provide countersunk nail holes, such as the nail holes 93 illustrated in Fig. 6 of the drawings, it is only necessary to form the die punch 82 with complementary nail hole forming elements to effect the countersunk nail holes 93. Should it be desired to provide striations transversely of the finished end product or shingle, it is only necessary to emboss the under surface or plate 83a of the punch 82 with ridges to form such striations 94 as depicted in Fig. 4 of the annexed drawings. In the event it is desired to form the shingle with striations terminating short of the one lateral edge of the end product, such as indicated by the striations 96 in Fig. 5 of the annexed drawings, it is only necessary to form the external surface of the die punch 82 of the press with ridges conforming to the disposition of the striations 96 and terminating short of one lateral edge of the die punch surface so that the end product will take the form shown in Fig. 5.

Figure 8:
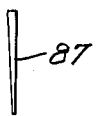
Fig. 8 is an end view of a tapered shingle produced by my improved method and apparatus.

It is obvious that the shingle which is formed in the press has a bottom surface conforming to the surface of its particular pallet on which it is carried into the press by the conveyer 14 or by the surface of the belt if no pallet is used. Moreover, the sides of the shingle thus formed in the press conform to the edges of the movable conforming-ring 84 of the press. The top surface of the finished shingle, as indicated above, conforms to the embossed or other type surface 83a of the punch since the bottom surface of the punch forms the top of the shingle and it is to be observed that this bottom surface of the punch may also be tapered, if desired to provide a tapered end product or shingle 87, as depicted in Fig. 8 of the annexed drawings. The formed shingle, previously consisting of the free-flowing fibro-cementitious mixture consists as an end product of a dense, homogeneous mixture of fiber and hydraulic cement with only enough moisture left in it, approximately ten per cent (10%) by weight, to enable the hydraulic cement therein to complete its chemical reaction. The shingles manufactured with the equipment illustrated and following the process set forth approximates twelve inches by twenty-four inches in area and approximately 5/32 of an inch at its thinnest section, although its thickest section may be up to one-half inch. Because of its dense structure it is exceptionally strong and relatively moistureproof. The density and strength of the end product is effected by the utilization of the free-flowing mixture which upon reaching the press fills every minute portion of the die, permeates and surrounds each individual fiber and it is only when the relatively high pressure is applied at the bottom stroke of the press that the excess water is released.

Experience has proven that the shingle produced by my improved process is best cured in order to gain its final strength by utilizing high-frequency electricity immediately after the pressing operation by the press 16. To this end, I provide an electronic unit depicted in Fig. 10 of the drawings and carrying the reference numeral 17, the electronic unit being connected into a suitable electrical circuit for intermittently energizing the electronic unit as the shingles are moved by the conveyer 14 from the press 16 into the unit 17 and below the electronic unit where they are rapidly heated and cured. Since the curing or high-frequency unit 17 is no part, per se, of the present invention the details thereof are not herein described nor claimed. If desired, however, the high-frequency unit 17 may be dispensed with and the curing of the formed and pressed shingle can be effected by utilizing commercially available quick-setting admixtures which are introduced into the free-flowing mixture prior to entering the press and preferably at the agitating chamber 12. If desired, a combination of commercially available quick-setting admixtures and the high-frequency unit 17 may be utilized for curing the shingles or, the well-known atmospheric-pressure-steam curing can be utilized to effect rapid curing of the shingles.

I claim:

1. A method of manufacturing fiber-cement shingles utilizing free-flowing mixtures of fiber, hydraulic-cement and water, said method comprising dividing a mass of shingle grade asbestos fibres into a plurality of individual fibres and simultaneously moving said individual fibres at high velocity, driving said individual fibres at said velocity into an agitating mixture of cement and water thereby forming a free-flowing mixture of hydraulic-cement and water surrounding individual fibers of shingle grade fiber, flowing said mixture into a confined space of predetermined volume, intermittently and recurrently flowing the mixture from said confined space to deposit successive, constant volumes thereof onto a movable endless surface in successive areas thereof and intermittently and recurrently replacing successive batches of said mixture into said confined space, intermittently and recurrently moving said endless surface in timed relationship with flowing the mixture from said confined space to advance successive, constant volumes of the mixture on said endless surface to a predetermined location, intermittently and recurrently subjecting successive, constant volumes of said mixture at said predetermined location and in time relationship to the movement of said endless surface to a pressure of at least 1000 pounds per square inch while simultaneously confining said successive volumes of said mixture within predetermined dimensional limits as well as simultaneously extracting water from said mixture in excess of the requisite water to hydrate the cement thereby to form fiber-cement shingles of predetermined dimensions and strength.

2. A method of manufacturing fiber-cement shingles utilizing free-flowing mixtures of fiber, hydraulic-cement and water, said method comprising the steps of agitating hydraulic-cement and water to form a homogeneous mass; subjecting a quantity of shingle grade fiber approximating 10% to 20%, by weight, of the hydraulic-cement of said mass to violent agitation to separate the quantity of fiber into individual fibers, driving the individual fibers of said quantity into said homogeneous mass of hydraulic-cement and water to effect the encompassing thereby of each individual fiber and a free-flowing mixture of fiber, hydraulic-cement and water, flowing said free-flowing mixture into a confined space of predetermined volume, intermittently and re-currently flowing the mixture from said confined space to deposit successive, constant volumes thereof onto a movable endless surface in successive areas thereof and intermittently and re-currently replacing successive batches of said mixture into said confined space, intermittently and re-currently moving said endless surface in time relationship with flowing the mixture from said confined space to advance successive, constant volumes of the mixture on said endless surface to a predetermined location, intermittently and re-currently subjecting successive, constant volumes of said mixture at said predetermined locations and in time relationship to the movement of said endless surface to a pressure of at least 1000 pounds per square inch while simultaneously confining said successive volumes of said mixture within predetermined dimensional limits as well as simultaneously extracting water from said mixture in excess of the requisite water to hydrate the cement thereby to form fiber-cement shingles of predetermined dimensions and strength.

3. A method of manufacturing fiber-cement shingles utilizing free-flowing mixtures of fiber, hydraulic cement and water, said method comprising the steps of agitating hydraulic-cement and water to form a homogeneous mass, subjecting a quantity of shingle grade fiber approximating 10% to 20%, by weight, of the hydraulic-cement of said mass to violet agitation to separate the quantity of fiber into individual fibers, driving the individual fibers of said quantity into said homogeneous mass of hydraulic-cement and water to effect the encompassing thereby of each individual fiber and a free-flowing mixture of fiber, hydraulic-cement and water, flowing said free-flowing mixture into a confined space of predetermined volume, intermittently and re-currently flowing the mixture from said confined space to deposit successive, constant volumes thereof onto a movable endless surface in successive areas thereof and intermittently and re-currently replacing successive batches of said mixture into said confined space, intermittently and re-currently moving said endless surface in time relationship with flowing the mixture from said confined space to advance successive, constant volumes of the mixture on said endless surface to a predetermined location, intermittently and re-currently subjecting successive, constant volumes of said mixture at said predetermined location and in time relationship to the movement of said endless surface to a pressure of at least 1000 pounds per square inch while simultaneously confining said successive volumes of said mixture within predetermined dimensional limits as well as simultaneously extracting water from said mixture in excess of the requisite water to hydrate the cement, subjecting successive, constant volumes of said free-flowing mixture while on said endless surface and prior to reaching said predetermined location to the action of a roller to spread the volume to approximate the dimensions of the finished shingle, and subjecting the formed shingles while on said endless surface to high-frequency electronic activation to enhance the curing of the shingles.

4. A method for producing fiber-cement shingles from free-flowing mixtures of fiber, hydraulic-cement and water as defined in claim 2, and including the step of introducing a quick-setting agent into said free-flowing mixture at any stage of the method to enhance the rapidity of curing the formed shingles.

5. Apparatus for producing fiber-cement shingles from free-flowing mixtures of fiber, hydraulic-cement and water, said apparatus comprising a mixer holding a homogeneous mass of constantly agitating hydraulic-cement and water, a chamber for holding batches of shingle grade fiber; said chamber being adapted to be placed in communication with said mixer, means in said chamber for violently agitating the batch of fiber to separate the fiber into individual suspended strands and to drive the individual strands of fiber into the homogeneous mass of hydraulic-cement and water in said mixer where the fibers are entirely surrounded and a free-flowing mixture of fiber, hydraulic-cement and water is provided, a screw-extruder of predetermined volume open to said mixer for receiving constant volumes of said free-flowing mixture, means for intermittently and re-currently driving said extruder to displace successive, constant volumes of said free-flowing mixture from said extruder, an endless conveyor supported adjacent to the outlet of said extruder, means for intermittently and recurrently driving said conveyor in time relatioship to the operation of said extruder whereby said endless conveyor receives successive, constant volumes of said free-flowing mixture on successive areas thereof, an hydraulic-press through which said endless conveyor passes carrying successive batches of said free-flowing mixture, means for intermittently and re-currently operating said hydraulic press for exerting high pressures per square inch on successive volumes of said free-flowing mixtures and to compress the same into hard, fiber-cement shingles, means in and operated by said press for automatically extracting water from successive volumes of said free-flowing mixtures in excess of the water required to hydrate the cement therein, and means for enhancing the rapidity of curing the formed shingles.

6. Apparatus for producing fiber-cement shingles from free-flowing mixtures or fiber, hydraulic-cement and water, said apparatus comprising a mixer holding a homogeneous mass of constantly agitating hydraulic-cement and water, a chamber for holding batches of shingle grade fiber; said chamber being adapted to be placed in communication with said mixer, means in said chamber for violently agitating the batch of fiber to separate the fiber into individual suspended strands and to drive the individual strands of fiber into the homogeneous mass of hydraulic-cement and water in said mixer where the fibers are entirely surrounded and a free-flowing mixture of fiber, hydraulic-cement and water is provided, a screw-extruder of predetermined volume open to said mixer for receiving constant volumes of said free-flowing mixture, means for intermittently and re-currently driving said extruder to displace successive, constant volumes of said free-flowing mixtures from said extruler, an endless conveyer supported adjacent to the outlet of said extruder, means for intermittently and re-currently driving said conveyer in time relationship to the operation of said extruder whereby said endless conveyer receives successive, constant volumes of said free-flowing mixture on successive areas thereof, a roller rotatably supported adjacent to said endless conveyer, means for rotating said roller in time relationship to the movement of said endless conveyer, an hydraulic-press through which said endless conveyer passes carrying successive batches of said free-flowing mixture, means for intermittently and re-currently operating said hydraulic press for exerting high pressures per square inch on successive volumes of said free-flowing mixtures and to compress the same into hard, fiber-cement shingles of predetermined dimensions and strength, means in and operated by said press for automatically extracting from successive volumes of said free-flowing mixture an excess of the water required to hydrate the cement therein, and electronic means supported above said endless conveyer for activating the formed shingles to enhance the curing thereof.

7. In apparatus for manufacturing fibro-cementitious shingles utilizing a free-flowing mixture of hydraulic-cement and water and individual fibers embedded therein, a closed system comprising a blower having an inlet and outlet, a fiber chamber in communication with said inlet; said chamber being adapted to hold a predetermined mass of fibers, an agitator chamber for holding and agitating a mixture of hydraulic-cement and water; said agitator chamber being in communication with said outlet, and a conduit establishing air communication between the top of said agitator chamber and the bottom of said fiber chamber; actuation of said blower creating air circulation through said fiber chamber and causing the separation of individual fibers from the mass of fibers as well as driving the separated individual fibers under high pressure into said mixture in said agitator chamber to encompass each individual fiber with said mixture.

8. In apparatus for manufacturing fibro-cementitious shingles utilizing a free-flowing mixture of hydraulic-cement, and water and individual fibers embedded therein, an agitator chamber for holding and agitating a free-flowing mixture of hydraulic-cement and water and individual fibers embedded therein, an extruder reservoir in communication with the outlet of said agitator chamber and adapted to hold a predetermined volume of said mixture, an extruder unit communicating with said reservoir, means for constantly moving said free-flowing mixture from said reservoir to said extruder unit, an extruder conveyer movably supported in said unit, an endless conveyer supported adjacent to the outlet of said extruder conveyer, and an electro-mechanical system for recurrently and intermittently moving said extruder conveyer and said endless conveyer in synchronism for effecting the extrusion from said unit of predetermined volumes of said free-flowing mixture and deposition thereof on successive areas of said endless conveyer.

9. In apparatus for manufacturing fibro-cementitious shingles utilizing free-flowing mixtures of hydraulic-cement and water and individual fibers embedded therein, an extruder unit, an extruder conveyer movably mounted in said extruder unit, an endless conveyer supported adjacent to the outlet of said extruder conveyer, an electro-mechanical system for actuating said extruder conveyer and said endless conveyer in synchronism to effect the extrusion from said unit of predetermined volumes of a free-flowing mixture of hydraulic-cement, and water and individual fibers embedded therein onto successive areas of said endless conveyer, and a hydraulic press through which said endless conveyer passes, and means for operating said press in timed relationship to the movement of said endless conveyer for pressing and forming successive batches of said mixtures into shingles of predetermined dimensions and shapes and simultaneously extracting from said successive batches of said mixture water in excess of the requisite water to hydrate the cement therein.

10. In apparatus as defined in claim 9, and including a roller rotatably mounted above and in close proximity to the upper run of said endless conveyer for spreading successive batches of said mixture prior to the introduction thereof into said press.

11. In apparatus for manufacturing fibro-cementitious shingles utilizing free-flowing mixtures of hydraulic-cement and water and individual fibers embedded therein, an endless conveyer for receiving successive batches of said mixtures on spaced areas thereof, a hydraulic press through which said conveyer is caused to pass, means for operating said press in timed relationship to the movement of said endless conveyer, a die-punch in said press; said die-punch having a plurality of holes in the bottom thereof as well as a series of spaced grooves therein communicating with said holes, means for intermittently and recurrently pressing said die-punch into successive batches of said mixture delivered to said press by said endless conveyer and simultaneously effecting the extraction of water from said successive batches of said mixture, and means for removing water from the groove of said die-punch.

12. In apparatus as defined in claim 11, and including a conforming-ring surrounding said die-punch, and means in said press for moving said conforming-ring in relation to said die-punch to confine pressed batches of said mixture to predetermined dimensions.

References Cited in the file of this patent

UNITED STATES PATENTS

| Number | Name | Date |
|---|---|---|
| 1,758,200 | Pfeffer et al. | May 13, 1930 |
| 1,765,544 | Schuster | June 24, 1930 |
| 1,815,357 | Jaicks | July 21, 1931 |
| 1,905,541 | Wiener et al. | Apr. 25, 1933 |
| 1,921,100 | Schnurer | Aug. 8, 1933 |
| 2,113,717 | Brown | Apr. 12, 1938 |
| 2,245,678 | Keiding | June 17, 1941 |
| 2,309,206 | Newman | Jan. 26, 1943 |
| 2,338,813 | Hueter | Jan. 11, 1944 |
| 2,356,244 | Johnson | Aug. 22, 1944 |
| 2,359,201 | Chaplin et al. | Sept. 26, 1944 |
| 2,383,736 | Rembert et al. | Aug. 28, 1945 |
| 2,407,514 | Rembert | Sept. 10, 1946 |
| 2,435,646 | Cann | Feb. 10, 1948 |

FOREIGN PATENTS

| Number | Country | Date |
|---|---|---|
| 19,102 | Great Britain | of 1898 |
| 13,452 | Great Britain | of 1901 |